(12) United States Patent
Guo et al.

(10) Patent No.: US 12,340,616 B2
(45) Date of Patent: Jun. 24, 2025

(54) LAMINATED STRUCTURE, DISPLAY PANEL, AND ELECTRONIC DEVICE

(71) Applicant: HONOR DEVICE CO., LTD., Shenzhen (CN)

(72) Inventors: Renwei Guo, Shenzhen (CN); Yujia Zhou, Shenzhen (CN); Hongxing Wang, Shenzhen (CN); Pengfei Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 570 days.

(21) Appl. No.: 17/611,274

(22) PCT Filed: May 15, 2020

(86) PCT No.: PCT/CN2020/090531
§ 371 (c)(1),
(2) Date: Nov. 15, 2021

(87) PCT Pub. No.: WO2020/233521
PCT Pub. Date: Nov. 26, 2020

(65) Prior Publication Data
US 2022/0236469 A1    Jul. 28, 2022

(30) Foreign Application Priority Data
May 17, 2019   (CN) .......................... 201910415213.3

(51) Int. Cl.
*G02B 5/30* (2006.01)
*G06V 40/13* (2022.01)
(52) U.S. Cl.
CPC ....... *G06V 40/1318* (2022.01); *G02B 5/3083* (2013.01); *G06V 40/1324* (2022.01)

(58) Field of Classification Search
CPC .......... G06V 40/1318; G06V 40/1324; G02B 5/3083; G02B 5/3033; G02B 1/14
(Continued)

(56) References Cited

U.S. PATENT DOCUMENTS 8,488,091 B2   7/2013   Sakai
9,261,636 B2   2/2016   Seo et al.
(Continued)

FOREIGN PATENT DOCUMENTS

CN          202693957 U       1/2013
CN          103207426 A       7/2013
(Continued)

OTHER PUBLICATIONS

Li Pengfei, et al., "Concept and Technology of Under Screen Fingerprint Identification", Chinese scientific and technological terms. Apr. 30, 2018, 2 pages.
(Continued)

*Primary Examiner* — Stephone B Allen
*Assistant Examiner* — Boutsikaris Leonidas
(74) *Attorney, Agent, or Firm* — WOMBLE BOND DICKINSON (US) LLP

(57) ABSTRACT

The laminated structure includes a protective layer, a linear polarizing layer, and a quarter-wave plate that are laminated in sequence. The protective layer is used for polarizing light to form linearly polarized light. An angle between an absorption axis of the protective layer and an absorption axis of the linear polarizing layer is zero degrees. An angle between the absorption axis of the linear polarizing layer and an absorption axis of the quarter-wave plate is 45 degrees. There is no difference between a direction of the absorption axis of the protective layer and a direction of the absorption axis of the linear polarizing layer.

20 Claims, 10 Drawing Sheets

(58) Field of Classification Search
USPC .................................................. 359/483.01
See application file for complete search history.

(56) References Cited

U.S. PATENT DOCUMENTS

| | | | |
|---|---|---|---|
| 9,690,025 | B2 | 6/2017 | Qin |
| 10,339,359 | B2 | 7/2019 | Zhang et al. |
| 10,361,255 | B2 | 7/2019 | Zeng et al. |
| 10,832,028 | B2 | 11/2020 | Ling et al. |
| 11,182,585 | B2 | 11/2021 | He et al. |
| 11,216,635 | B2 | 1/2022 | Chen |
| 2003/0127656 | A1 | 7/2003 | Aizawa et al. |
| 2006/0132688 | A1* | 6/2006 | Yoda ............... G02F 1/133634 349/119 |
| 2008/0219522 | A1 | 9/2008 | Hook et al. |
| 2017/0372113 | A1 | 12/2017 | Zhang et al. |
| 2018/0005007 | A1* | 1/2018 | Du ........................ H10K 30/88 |
| 2018/0068166 | A1* | 3/2018 | Zeng ..................... G02F 1/1333 |
| 2018/0157369 | A1* | 6/2018 | Diao ..................... G02B 5/3083 |
| 2018/0301660 | A1* | 10/2018 | Liu ............................ B32B 5/22 |
| 2019/0179066 | A1* | 6/2019 | Park ........................ G02B 1/14 |
| 2020/0357863 | A1* | 11/2020 | Nakamura ............ G06F 1/1624 |
| 2021/0357609 | A1* | 11/2021 | Chen ................. G06V 40/1318 |
| 2021/0362601 | A1* | 11/2021 | Kumar ..................... B32B 7/12 |
| 2023/0103363 | A1* | 4/2023 | Li ........................ G06V 10/147 |

FOREIGN PATENT DOCUMENTS

| | | |
|---|---|---|
| CN | 103869400 A | 6/2014 |
| CN | 104062802 A | 9/2014 |
| CN | 105843452 A | 8/2016 |
| CN | 105954917 A | 9/2016 |
| CN | 107024551 A | 8/2017 |
| CN | 107025451 A | 8/2017 |
| CN | 107203732 A | 9/2017 |
| CN | 107230698 A | 10/2017 |
| CN | 107340561 A | 11/2017 |
| CN | 107728844 A | 2/2018 |
| CN | 107884982 A | 4/2018 |
| CN | 109036162 A | 12/2018 |
| CN | 109074492 A | 12/2018 |
| CN | 109190599 A | 1/2019 |
| JP | 2007310260 A | 11/2007 |
| JP | 2015028661 A | 2/2015 |
| KR | 20150099470 A | 8/2015 |
| KR | 20180069762 A | 6/2018 |
| RU | 2473942 C1 | 1/2013 |
| WO | 2016205130 A1 | 12/2016 |

OTHER PUBLICATIONS

Zhang, L., Yuan, HW. & Li, XM. Active polarization imaging method for latent fingerprint detection. Opt Quant Electron 50, 353 (2018), Dec. 31, 2018, 12 pages.

* cited by examiner

Provide a quarter wave plate, a linear polarizing layer, and a protective layer — 501

Attach the linear polarizing layer to the quarter wave plate, and arrange the protective layer on one side of the linear polarizing layer away from the quarter wave plate — 502

LAMINATED STRUCTURE, DISPLAY PANEL, AND ELECTRONIC DEVICE

CROSS-REFERENCE TO RELATED APPLICATIONS

This application is a national stage of International Application No. PCT/CN2020/090531, filed on May 15, 2020, which claims priority to Chinese Patent Application No. 201910415213.3, filed with the China National Intellectual Property Administration on May 17, 2019. The disclosures of which is hereby incorporated by reference in its entirety.

TECHNICAL FIELD

The present invention relates to the field of display technologies, and in particular, to a laminated structure, a display panel, and an electronic device.

BACKGROUND

Recently, more electronic devices are provided with an optical fingerprint recognition module under a display panel, to facilitate unlocking of the electronic devices by users. Light needs to pass through laminated layers, such as a protective layer, a linear polarizing layer, and a quarter-wave plate, of the display panel before entering the optical fingerprint recognition module. However, because of differences in materials of the laminated layers of the display panel, the stability of light transmission in the display panel are affected, resulting in low stability of the light intensity of light entering the optical fingerprint recognition module, and reducing the recognition precision of the optical fingerprint recognition module.

SUMMARY

A technical problem to be resolved by embodiments of this application is about a laminated structure, a display panel, and an electronic device that can improve the stability of light transmission.

To achieve the foregoing objective, implementations of this application adopt the following technical solutions:

According to a first aspect, an implementation of this application provides a laminated structure, including a protective layer, a linear polarizing layer, and a quarter-wave plate that are laminated in sequence. The protective layer is used to polarize light to form linearly polarized light. An angle between an absorption axis of the protective layer and an absorption axis of the linear polarizing layer is zero degrees. An angle between the absorption axis of the linear polarizing layer and an absorption axis of the quarter-wave plate is 45 degrees.

In this implementation, the angle between the absorption axis of the linear polarizing layer and the absorption axis of the protective layer is zero degrees, and there is no difference between a direction of the absorption axis of the protective layer and a direction of the absorption axis of the linear polarizing layer. Therefore, a luminous flux of light passing through the protective layer is roughly the same as that of light passing through the linear polarizing layer. In other words, the light intensity of the light passing through the protective layer is consistent with that of the light passing through the linear polarizing layer. In this way, the light loss during light transmission in the laminated structure can be reduced, and the stability of light transmission in the laminated structure can be improved, to stabilize the light intensity of light passing through the laminated structure, and improve the stability of light entering an optical fingerprint recognition module, thereby improving recognition precision of the optical fingerprint recognition module.

In a possible implementation, the laminated structure further includes a reinforcing layer, and the reinforcing layer is arranged between the protective layer and the linear polarizing layer, and used to protect the laminated structure and enhance the strength of the laminated structure.

In a possible implementation, the material strength of the reinforcing layer is greater than that of the protective layer.

In a possible implementation, the reinforcing layer is made of an isotropic material, to reduce the light loss during light transmission in the laminated structure, and enhance the stability of light transmission.

In a possible implementation, the linear polarizing layer is fixed to the reinforcing layer through an optical adhesive layer, to improve the bonding strength between the linear polarizing layer and the reinforcing layer.

In a possible implementation, the optical adhesive layer is made of an isotropic material, to further reduce the light loss during light transmission in the laminated structure, and enhance the stability of light transmission.

In a possible implementation, the reinforcing layer is a glass cover plate, to enhance the strength and protection performance of the laminated structure; and the protective layer is a film layer attached to one side of the reinforcing layer away from the linear polarizing layer, to prevent the reinforcing layer from being scratched and worn.

In a possible implementation, the reinforcing layer is used to polarize light to form linearly polarized light. An angle between an absorption axis of the reinforcing layer and the absorption axis of the linear polarizing layer is zero degrees. The reinforcing layer is set as a laminated layer in a direction consistent with the direction of the absorption axis of the linear polarizing layer, so that the optical performance of the reinforcing layer, the protective layer, and the linear polarizing layer can be matched, and the light intensity of light passing through the protective layer is consistent with that of light passing through the reinforcing layer and the linear polarizing layer, thereby enhancing the stability of light transmission.

In a possible implementation, the protective layer is a cover plate, and the protective layer is made of a material including one of ceramic and plastic, helping reduce a thickness of the laminated structure while increasing the strength of the protective layer.

In a possible implementation, the protective layer is made of materials including polyethylene terephthalate plastic and thermoplastic polyurethane elastomer rubber.

According to a second aspect, this application further provides a display panel, applied to an electronic device with an optical fingerprint recognition module. The display panel includes a functional substrate and the foregoing laminated structure that are laminated. The functional substrate is located on one side of a quarter-wave plate away from a protective layer, and the functional substrate has a light-transmitting area, to allow light emitted from the quarter-wave plate to enter the optical fingerprint recognition module through the light-transmitting area.

In this implementation, an angle between an absorption axis of the protective layer located on an outermost side of the display panel and an absorption axis of a linear polarizing layer is zero degrees, and there is no difference between a direction of the absorption axis of the protective layer and a direction of the absorption axis of the linear polarizing layer. Therefore, a luminous flux of light passing through the protective layer is roughly the same as that of light passing through the linear polarizing layer. In other words, the light intensity of light passing through the protective layer is consistent with that of light passing through the linear polarizing layer. In this way, the light loss during light transmission in the display panel can be reduced, and the stability of light transmission in the display panel can be improved, to stabilize the light intensity of light entering the optical fingerprint recognition module through the light-transmitting area of the functional substrate, and improve the stability of light entering the optical fingerprint recognition module, thereby improving the recognition precision of the optical fingerprint recognition module.

Further, the linearly polarized light passing through the protective layer becomes circularly polarized light passing through the linear polarizing layer and the quarter-wave plate. Part of the circularly polarized light is reflected into reversely polarized light due to a reflection structure in the display panel (such as a metal part in the functional substrate or an interface between adjacent laminated layers). The reversely polarized light is further rotated by 45 degrees after being incident to the quarter-wave plate to become linearly polarized light perpendicular to the direction of the absorption axis of the linear polarizing layer. Therefore, reflected light reflected by the reflection structure in the display panel can be effectively eliminated, thereby improving display and visual effects of the display panel.

In a possible implementation, the functional substrate includes a first light-transmitting layer, a plurality of reflection units, and a second light-transmitting layer. The plurality of reflection units are spaced on the first light-transmitting layer, the second light-transmitting layer covers the reflection units and the first light-transmitting layer, and the second light-transmitting layer is located between the quarter-wave plate and the first light-transmitting layer. Because the first light-transmitting layer and the second light-transmitting layer are arranged around the reflection units, an impact force when the laminated structure is collided can be buffered, which is beneficial to prolong life of the laminated structure.

In a possible implementation, both the first light-transmitting layer and the second light-transmitting layer are made of isotropic materials, to further reduce the light loss during light transmission in the laminated structure, and enhance the stability of the light intensity of light transmitting through the laminated structure, thereby improving the recognition precision of the optical fingerprint recognition module.

In a possible implementation, the first light-transmitting layer and the second light-transmitting layer are made of resin.

In a possible implementation, the reflection units are configured to emit light. When a finger touches one side of the protective layer away from the linear polarizing layer, or when a finger is at a specific distance from one side of the protective layer away from the linear polarizing layer, the light emitted by the reflection units can be reflected by the finger and enter the optical fingerprint recognition module through the light-transmitting area, thereby completing an optical fingerprint recognition function.

In a possible implementation, the display panel further includes a touch layer, arranged between the functional substrate and the quarter-wave plate.

According to a third aspect, an implementation of this application further provides an electronic device, including the foregoing laminated structure and an optical fingerprint recognition module. The optical fingerprint recognition module is located on one side of a functional substrate away from a protective layer, and configured to receive light passing through a light-transmitting area of the functional substrate.

In this implementation, an angle between an absorption axis of the protective layer located on an outermost side of the display panel and an absorption axis of a linear polarizing layer is zero degrees, and there is no difference between a direction of the absorption axis of the protective layer and a direction of the absorption axis of the linear polarizing layer. Therefore, a luminous flux of light passing through the protective layer is roughly the same as that of light passing through the linear polarizing layer. In other words, the light intensity of the light passing through the protective layer is consistent with that of the light passing through the linear polarizing layer. In this way, the light loss during light transmission in the display panel can be reduced, and the stability of light transmission in the display panel can be improved, to stabilize the light intensity of light entering the optical fingerprint recognition module through the light-transmitting area of the functional substrate, and improve the stability of light entering the optical fingerprint recognition module, thereby improving the recognition precision of the optical fingerprint recognition module.

According to a fourth aspect, an implementation of this application further provides a method for preparing a laminated structure, including the following steps: providing a quarter-wave plate, a linear polarizing layer, and a protective layer; attaching the linear polarizing layer to the quarter-wave plate, and arranging the protective layer on one side of the linear polarizing layer away from the quarter-wave plate, so that the protective layer, the linear polarizing layer, and the quarter-wave plate are laminated. The protective layer is used to polarize light to form linearly polarized light. An angle between an absorption axis of the protective layer and an absorption axis of the linear polarizing layer is zero degrees. An angle between the absorption axis of the linear polarizing layer and an absorption axis of the quarter-wave plate is 45 degrees.

In a possible implementation, the arranging the protective layer on one side of the linear polarizing layer away from the quarter-wave plate includes: arranging a reinforcing layer on one side of the linear polarizing layer away from the quarter-wave plate, and arranging the protective layer on one side of the reinforcing layer away from the linear polarizing layer.

In a possible implementation, the arranging a reinforcing layer on one side of the linear polarizing layer away from the quarter-wave plate includes: fixing the reinforcing layer on the linear polarizing layer through an optical adhesive layer.

It should be understood that, the descriptions of technical features, technical solutions, beneficial effects, or similar expressions in this application are not intended to imply that all the features and advantages can be achieved in any single embodiment. On the contrary, it may be understood that the description of features or beneficial effects means that a specific technical feature, technical solution, or beneficial effect is included in at least one embodiment. Therefore, the descriptions of technical features, technical solutions, or beneficial effects in this specification do not necessarily refer to the same embodiment. In addition, the technical features, technical solutions, and beneficial effects described in this embodiment can also be combined in any appropriate manner. A person skilled in the art can understand that the embodiments can be implemented without one or more specific technical features, technical solutions, or beneficial effects of a specific embodiment. In other embodiments,

DESCRIPTION OF EMBODIMENTS

Figure 1:
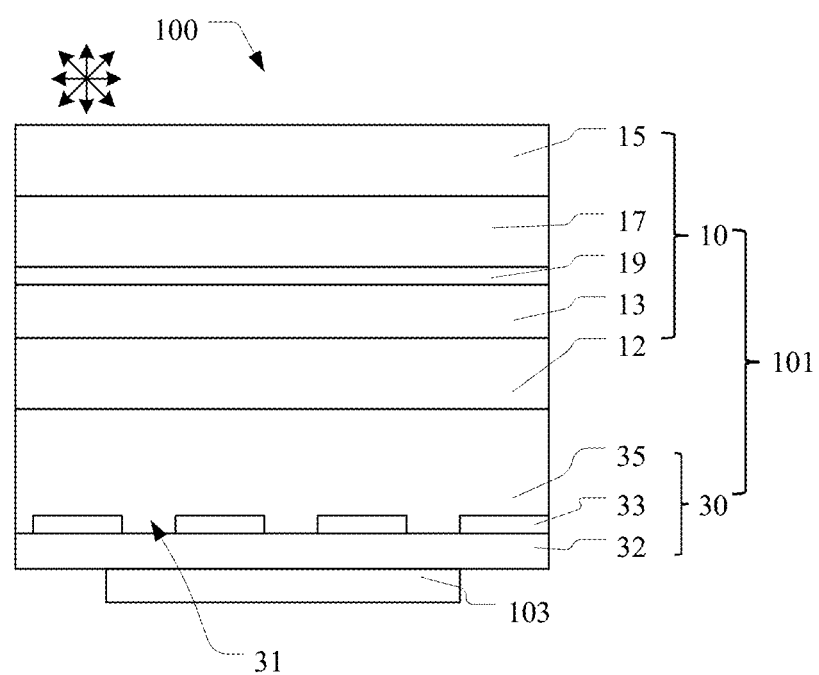
FIG. 1 is a schematic diagram of a partial structure of an electronic device according to a first implementation of this application.

FIG. 1 is a schematic diagram of a partial structure of an electronic device according to a first implementation. The electronic device 100 includes a display panel 101 and an optical fingerprint recognition module 103 that are laminated. The display panel 101 is located on a light entrance side of the optical fingerprint recognition module 103, and is configured to display an image. The optical fingerprint recognition module 103 is configured to receive light transmitting through the display panel 101 to implement a fingerprint recognition function. The electronic device 100 may be any electronic device such as a smartphone, a smart watch, a tablet computer, a personal digital assistant (personal digital assistant, PDA for short), a point of sales (point of sales, POS for short), an on-board computer, a desktop computer, a laptop computer, or a smart TV. This is not limited in the embodiments of the present invention.

The display panel 101 includes a laminated structure 10 and a functional substrate 30 that are laminated. The functional substrate 30 is located between the laminated structure 10 and the optical fingerprint recognition module 103. The functional substrate 30 has a light-transmitting area 31, to allow light to enter the optical fingerprint recognition module 103 through the light-transmitting area 31.

Specifically, the laminated structure 10 includes a quarter-wave plate (quarter-wave plate, QWP for short) 12, a linear polarizing layer 13, and a protective layer 15. The functional substrate 30 is located between the optical fingerprint recognition module 103 and the quarter-wave plate 12. The quarter-wave plate 12 can make ordinary light (o light) and extraordinary light (e light) equal to $\pi/2$ or an odd multiple thereof. The quarter-wave plate 12 is sandwiched between the functional substrate 30 and the linear polarizing layer 13. The protective layer 15 is arranged on one side of the linear polarizing layer 13 away from the quarter-wave plate 12. Both the protective layer 15 and the linear polarizing layer 13 can polarize light to form linearly polarized light. An angle between an absorption axis of the linear polarizing layer 13 and an absorption axis of the protective layer 15 is zero degrees. An angle between an absorption axis of the quarter-wave plate 12 and the absorption axis of the linear polarizing layer 13 is 45 degrees. An angle between the absorption axis of the protective layer 15 and the absorption axis of the quarter-wave plate 12 is 45 degrees.

In this implementation, in the linear polarizing layer 13, light parallel to the absorption axis of the linear polarizing layer 13 may be absorbed by the linear polarizing layer 13, and light perpendicular to the absorption axis of the linear polarizing layer 13 may be emitted through the linear polarizing layer 13; and in the protective layer 15, light parallel to the absorption axis of the protective layer 15 may be absorbed by the protective layer 15, and light perpendicular to the absorption axis of the protective layer 15 may be emitted through the protective layer 15.

Light is incident from the protective layer 15 in a direction opposite to the linear polarizing layer 13, becomes linearly polarized light passing through the protective layer 15, enters the linear polarizing layer 13, and then is converted into circularly polarized light by the quarter-wave plate 12. Part of the circularly polarized light enters the optical fingerprint recognition module 103 through the functional substrate 30.

The protective layer 15 can polarize the light incident therein to form linearly polarized light, an angle between the absorption axis of the linear polarizing layer 13 and the absorption axis of the protective layer 15 is zero degrees, and there is no difference between a direction of the absorption axis of the protective layer 15 and a direction of the absorption axis of the linear polarizing layer 13. Therefore, a luminous flux of light passing through the protective layer 15 is roughly the same as that of light passing through the linear polarizing layer 13. In other words, the light intensity of the light passing through the protective layer 15 is consistent with that of the light passing through the linear polarizing layer 13. In this way, the light loss during light transmission from the display panel 10 to the optical fingerprint recognition module 30 can be reduced, and the stability of light passing through the display panel 101 can be improved, to stabilize the light intensity of the light passing through the display panel 101, and improve the stability of the light entering the optical fingerprint recognition module 103, thereby improving the recognition precision of the optical fingerprint recognition module 103.

The protective layer 15 is arranged on one side of the laminated structure 10 away from the optical fingerprint recognition module 103, namely, an outermost side of the electronic device 100. The laminated structure 10 further includes a reinforcing layer 17 arranged between the protective layer 15 and the linear polarizing layer 13, and used to protect other laminated structures of the laminated structure 10 and enhance the strength of the laminated structure 10. The reinforcing layer 17 is a glass cover plate and can enhance the strength of the laminated structure 10. In this implementation, the material strength of the reinforcing layer 17 is greater than that of the protective layer 15. The protective layer 15 is a film layer attached to one side of the reinforcing layer 17 away from the linear polarizing layer 13, for example, a protective film on the outermost side of the display panel 101 of a smartphone, to prevent the reinforcing layer 17 from being scratched and worn.

The protective layer 15 is made of materials including polyethylene terephthalate (polyethylene terephthalate, PET for short) plastic and thermoplastic polyurethane (thermoplastic polyurethane, TUP for short) elastomer rubber. The reinforcing layer 17 is fixed to the linear polarizing layer 13 through an optical adhesive layer 19. The reinforcing layer 17 is made of an isotropic material, to reduce the light loss during light transmission in the laminated structure 10, and enhance the stability of light transmission. The isotropic refers to a property that physical and chemical properties of an object do not change due to different directions, namely, performance values of an object measured in different directions are completely the same, and is also known as homogeneity. The optical adhesive layer 19 is made of an isotropic material, to further reduce the light loss during light transmission in the laminated structure 10, and enhance the stability of light transmission. It may be understood that, implementations of this application do not limit the material of the protective layer 15 and the material of the reinforcing layer 17. For example, the reinforcing layer 17 may be made of plastic or ceramic.

In a possible implementation, the reinforcing layer 17 is used to polarize light to form linearly polarized light. An angle between an absorption axis of the reinforcing layer 17 and the absorption axis of the linear polarizing layer 13 is zero degrees. The reinforcing layer 17 is set as a laminated layer in a direction consistent with the direction of the absorption axis of the linear polarizing layer, so that the light intensity of light passing through the protective layer 15 is consistent with that of light passing through the reinforcing layer 17 and the linear polarizing layer 13, and the optical performance of the reinforcing layer 17, the protective layer 15 and the linear polarizing layer 13 can be matched, thereby enhancing the stability of light transmission in the laminated structure 10.

In this implementation, the display panel 101 is a flexible display panel. The functional substrate 30 is an organic light-emitting diode (organic light-emitting diode, OLED for short) substrate. More specifically, the functional substrate 30 includes a first light-transmitting layer 32, a plurality of reflection units 33, and a second light-transmitting layer 35. The reflection units 33 are configured to reflect light irradiated thereon. The reflection units 33 are also light-emitting units, configured to emit light. Light emitted by the reflection units 33 can be reflected by a finger and enter the optical fingerprint recognition module 103 through the light-transmitting area 31, thereby implementing an optical fingerprint recognition function. The plurality of reflection units 33 are spaced on one side of the first light-transmitting layer 32. The second light-transmitting layer 35 covers the reflection units 33 and the first light-transmitting layer 32. The light-transmitting area 31 is formed between the adjacent reflection units 33. The second light-transmitting layer 35 is located between the quarter-wave plate 12 and the first light-transmitting layer 32. It may be understood that, the functional substrate 30 may also be a touch layer.

Because the reflection units 33 are surrounded by the first light-transmitting layer 32 and the second light-transmitting layer 35, namely, the first light-transmitting layer 32 and the second light-transmitting layer 35 are arranged around the reflection units 33, an impact force on the reflection units 33 when the laminated structure 10 is collided can be buffered, which is beneficial to prolong life of the display panel 101. In this implementation, both the first light-transmitting layer 32 and the second light-transmitting layer 35 are made of isotropic materials, to reduce the light loss during light transmission in the display panel 101, and enhance the stability of the light intensity when light passes through the display panel 101. The reflection units 33 may be a circuit part such as a cathode and an anode.

In some implementations, the display panel 101 may be a touch display panel, and the display panel 101 further includes a touch layer, arranged between the functional substrate 30 and the quarter-wave plate 12.

In some implementations, the protective layer 15 only needs to meet a condition that the angle between the absorption axis of the linear polarizing layer 13 and the absorption axis of the protective layer 15 is zero degrees.

It may be understood that, the laminated structure 10 includes the protective layer 15, the linear polarizing layer 13, and the quarter-wave plate 12 that are laminated in sequence. The protective layer 15 is used to polarize light to form the linearly polarized light, the angle between the absorption axis of the protective layer 15 and the absorption axis of the linear polarizing layer 13 is zero degrees, and the angle between the absorption axis of the linear polarizing layer 13 and the absorption axis of the quarter-wave plate 12 is 45 degrees.

Figure 2:
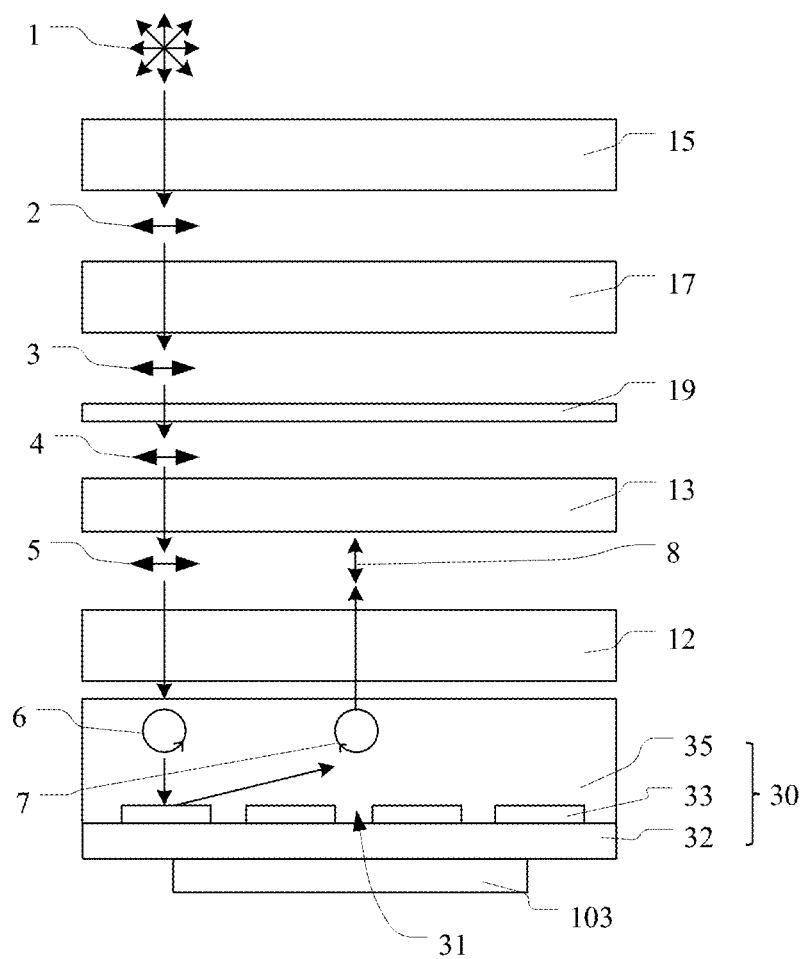
FIG. 2 is a schematic diagram of a light path of light incident to a display panel in the first implementation of this application.

FIG. 2 is a light path of light incident to a laminated structure in the first implementation of this application.

The light is natural light. After light 1 is incident from one side of the protective layer 15 away from the reinforcing layer 17, the protective layer 15 first polarizes the incident light to form linearly polarized light 2.

The linearly polarized light 2 enters the linear polarizing layer 13 after passing through the reinforcing layer 17 and the optical adhesive layer 19. Because the angle between the absorption axis of the linear polarizing layer 13 and the absorption axis of the protective layer 15 is zero degrees, the linearly polarized light 2 is still linearly polarized light passing through the linear polarizing layer 13.

The linearly polarized light passing through the reinforcing layer 17, the linearly polarized light passing through the optical adhesive layer 19, and the linearly polarized light passing through the linear polarizing layer 13 are marked as linearly polarized light 3, linearly polarized light 4, and linearly polarized light 5 respectively. The linearly polarized light 5 is converted into circularly polarized light 6, for example, right circularly polarized light shown in FIG. 2, after passing through the quarter-wave plate 12.

The circularly polarized light 6 enters the functional substrate 30. Part of the circularly polarized light 6 is reflected by the reflection units 33 of the functional substrate 30 and becomes reversely polarized light 7, for example, left circularly polarized light shown in FIG. 2. The reversely polarized light 7 is emitted from the functional substrate 30 and enters the quarter-wave plate 12. The reversely polarized light 7 is converted into linearly polarized light 8 after passing through the quarter-wave plate 12. Obviously, a polarization angle of the linearly polarized light 8 is rotated by 90 degrees with respect to the linearly polarized light 5. Because the linearly polarized light 8 is perpendicular to the absorption axis of the linear polarizing layer 13, part of the linearly polarized light 8 cannot pass through the linear polarizing layer 13, thereby reducing reflected light caused by the reflection units 33 in the laminated structure 10. Part of the circularly polarized light 6 enters the optical fingerprint recognition module 103 through the light-transmitting area 31.

Figure 3:
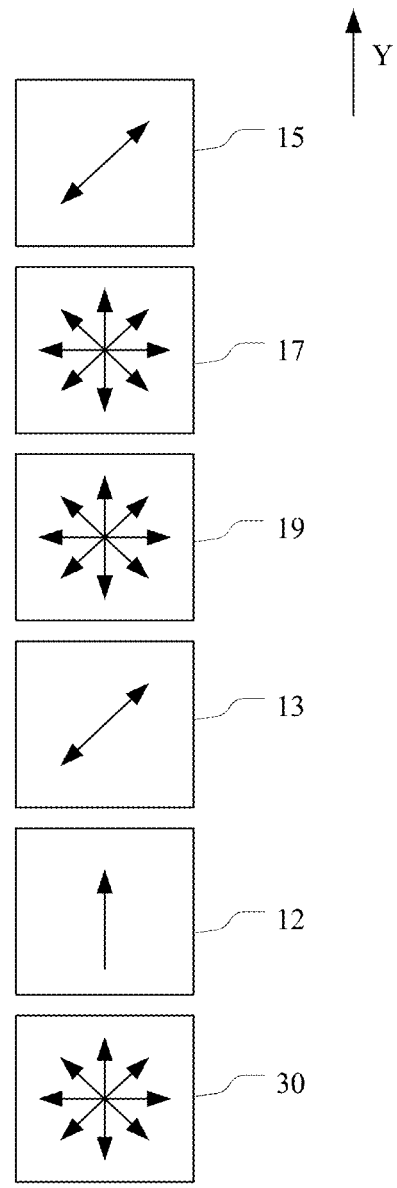
FIG. 3 is a schematic diagram of absorption axes of laminated layers of the display panel in the first implementation of this application.

FIG. 3 is a schematic diagram of absorption axes of laminated layers of the laminated structure in the first implementation of this application. The absorption axis of the protective layer 15 is a bidirectional absorption axis, the absorption axis of the linear polarizing layer 13 is a bidirectional absorption axis, and the absorption axis of the quarter-wave plate 12 is a unidirectional absorption axis. An inclination angle of the absorption axis of the protective layer 15 with respect to a first direction (for example, a Y direction shown in FIG. 3) is defined as N degrees. The bidirectional absorption axis means that a laminated layer (for example, the protective layer 15 or the linear polarizing layer 13) has the same effects on light in a positive direction and a negative direction of the absorption axis. The unidirectional absorption axis means that a laminated layer (for example, the quarter-wave plate 12) has different effects on light in a direction positive and a negative direction of the absorption axis. For example, because the absorption axis of the protective layer 15 is the bidirectional absorption axis, the light intensity of light passing through the protective layer 15 is the same when the absorption axis of the protective layer 15 is inclined by 45 degrees and 135 degrees with respect to the first direction. Because the absorption axis of the quarter-wave plate 12 is the unidirectional absorption axis, the light intensity of light passing through the quarter-wave plate 12 is different when the absorption axis of the quarter-wave plate 12 is inclined by 45 degrees and 135 degrees with respect to the first direction. It may be understood that, the N degrees can be any angle. An angle between the absorption axis of the protective layer 15 and the first direction and an angle between the absorption axis of the linear polarizing layer 13 and the first direction (for example, the Y direction shown in FIG. 3) are N degrees. An angle between the absorption axis of the quarter-wave plate 12 and a positive direction of the first direction is N−45 degrees. In this implementation, N is 45 degrees, that is, the absorption axis of the quarter-wave plate 12 is consistent with the positive direction of the first direction. The angle between the absorption axis of the quarter-wave plate 12 and the absorption axis of the protective layer 15 is 45 degrees. In other words, the angle between the absorption axis of the quarter-wave plate 12 and the positive direction of the first direction is zero degrees.

An example in which the electronic device 100 is a mobile phone is used below for description.

Figure 4A:
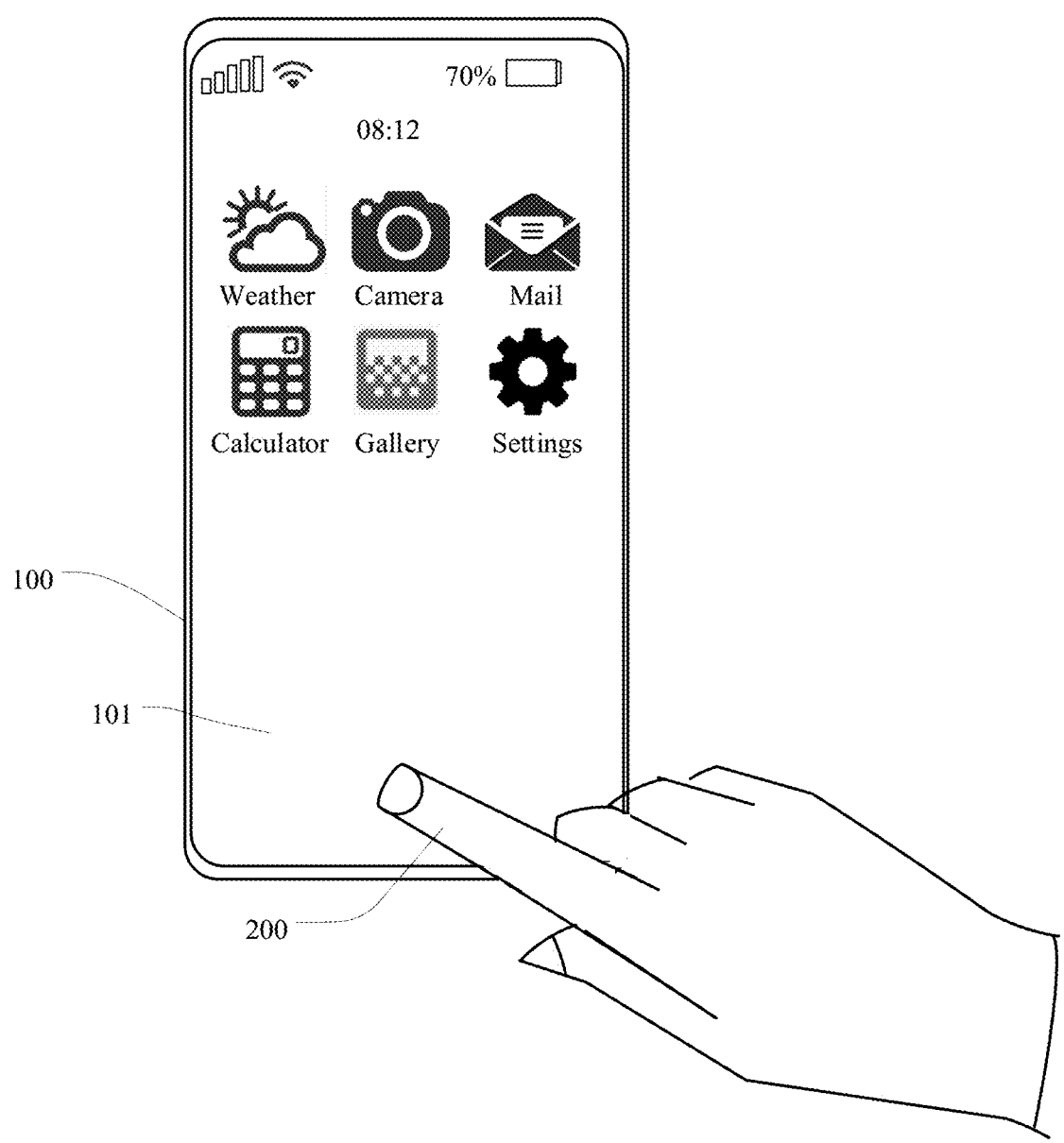
FIG. 4a is a schematic diagram of an application scenario when fingerprint recognition is performed by an electronic device according to an implementation of this application.
Figures 4B, 5:
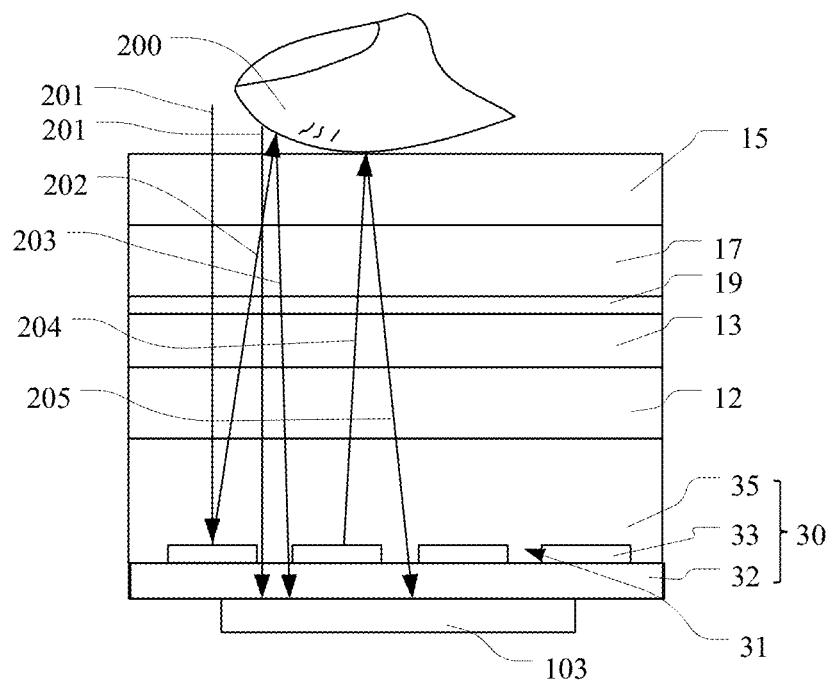
FIG. 4b is a schematic diagram when fingerprint recognition is performed by a partial structure of an electronic device according to an implementation of this application.
FIG. 5 is a flowchart of a method for preparing a laminated structure according to an implementation of this application.

FIG. 4a is a schematic diagram of an application scenario when fingerprint recognition is performed by an electronic device according to an implementation of this application. FIG. 4b is a schematic diagram when fingerprint recognition is performed by a partial structure of an electronic device according to an implementation of this application. A finger 200 touches a display panel 101 to enable the electronic device 100 to perform fingerprint recognition. The finger 200 is located on one side of a protective layer 15 away from a linear polarizing layer 13, to facilitate an optical fingerprint recognition module 103 to perform fingerprint recognition. It may be understood that, there may also be a specific gap between the finger 200 and the protective layer 15, and a surface of the finger 200 can reflect light to the display panel 101.

External light 201 is incident from the protective layer 15 and transmitted to a functional substrate 30 through a reinforcing layer 17, an optical adhesive layer 19, the linear polarizing layer 13, and a quarter-wave plate 12. Part of the external light 201 is reflected by reflection units 33 into first reflected light 202, and part of the external light 201 enters the optical fingerprint recognition module 103 through a light-transmitting area 31. In actual application, only part of the first reflected light 202 cannot pass through the linear polarizing layer 13 after passing through the quarter-wave plate 12, namely, is eliminated, while part of the first reflected light 202 can still be emitted from the protective layer 15 to reach the surface of the finger 200. The first reflected light 202 emitted from the protective layer 15 is reflected by the surface of the finger 200 into second reflected light 203. The second reflected light 203 enters the functional substrate 30 through the protective layer 15, the reinforcing layer 17, the optical adhesive layer 19, the linear polarizing layer 13, and the quarter-wave plate 12, and is incident to the optical fingerprint recognition module 103 through the light-transmitting area 31 of the functional substrate 30.

The reflection units 33 emit light 204. The light 204 is emitted to the surface of the finger 200 through the quarter-wave plate 12, the linear polarizing layer 13, the optical adhesive layer 19, the reinforcing layer 17, and the protective layer 15. The light 204 is reflected by the surface of the finger 200 into third reflected light 205. The third reflected light 205 then enters the optical fingerprint recognition module 103 through the protective layer 15, the reinforcing layer 17, the optical adhesive layer 19, the linear polarizing layer 13, the quarter-wave plate 12, and the light-transmitting area 31 of the functional substrate 30. The optical fingerprint recognition module 103 performs fingerprint recognition.

An angle between an absorption axis of the protective layer 15 and an absorption axis of the linear polarizing layer 13 is zero degrees, and a luminous flux of the reflected light (for example, the second reflected light 203 or the third reflected light 205) reflected from the surface of the finger 200 after passing through the protective layer 15 is roughly the same as that after passing through the linear polarizing layer 13. In other words, the light intensity of light passing through the protective layer 15 is consistent with that of light passing through the linear polarizing layer 13, to stabilize the light intensity of light passing through the display panel 101, and improve the stability of the light passing through the display panel 101, thereby improving the recognition precision of the optical fingerprint recognition module 103.

FIG. 5 a flowchart of a method for preparing a laminated structure according to an implementation of this application. The method for preparing a laminated structure includes the following steps:

Step 501: Provide a quarter-wave plate, a linear polarizing layer and a protective layer.

Step 502: Attach the linear polarizing layer to the quarter-wave plate, and arrange the protective layer on one side of the linear polarizing layer away from the quarter-wave plate, so that the protective layer, the linear polarizing layer and the quarter-wave plate are laminated, where the protective layer is used to polarize light to form linearly polarized light, an angle between an absorption axis of the protective layer and an absorption axis of the linear polarizing layer is zero degrees, and an angle between the absorption axis of the linear polarizing layer and an absorption axis of the quarter-wave plate is 45 degrees.

In an implementation, the arranging the protective layer on one side of the linear polarizing layer away from the quarter-wave plate includes: arranging a reinforcing layer on one side of the linear polarizing layer away from the quarter-wave plate, and arranging the protective layer on one side of the reinforcing layer away from the linear polarizing layer.

In another implementation, the arranging a reinforcing layer on one side of the linear polarizing layer away from the quarter-wave plate includes: fixing the reinforcing layer on the linear polarizing layer through an optical adhesive layer.

Embodiment 2

Figure 6:
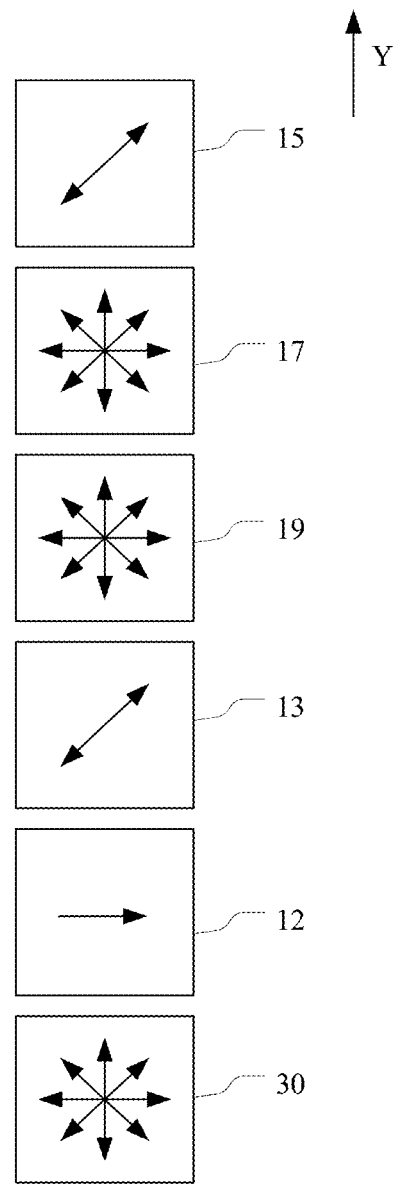
FIG. 6 is a schematic diagram of absorption axes of laminated layers of a display panel according to a second implementation of this application.

FIG. 6 is a schematic diagram of absorption axes of laminated layers of a display panel according to a second implementation of this application. The display panel provided in the second implementation is roughly the same as the display panel provided in the first implementation, except that an angle between an absorption axis of a quarter-wave plate 12 and a positive direction of a first direction is N+45 degrees, where N is 45 degrees. In this case, the angle between the absorption axis of the quarter-wave plate 12 and the positive direction of the first direction is 90 degrees, and an angle between an absorption axis of a protective layer 15 and the absorption axis of the quarter-wave plate 12 is 45 degrees.

The protective layer 15 can polarize light incident therein to form linearly polarized light, an angle between an absorption axis of a linear polarizing layer 13 and the absorption axis of the protective layer 15 is zero degrees, and there is no difference between a direction of the absorption axis of the protective layer 15 and a direction of the absorption axis of the linear polarizing layer 13. Therefore, a luminous flux of light passing through the protective layer 15 is roughly the same as that of light passing through the linear polarizing layer 13. In other words, the light intensity of the light passing through the protective layer 15 is consistent with that of the light passing through the linear polarizing layer 13, and the stability of light passing through the display panel is improved, to stabilize the light intensity of the light passing through the display panel, and improve the stability of light entering an optical fingerprint recognition module, thereby improving the recognition precision of the optical fingerprint recognition module.

Embodiment 3

Figure 7:
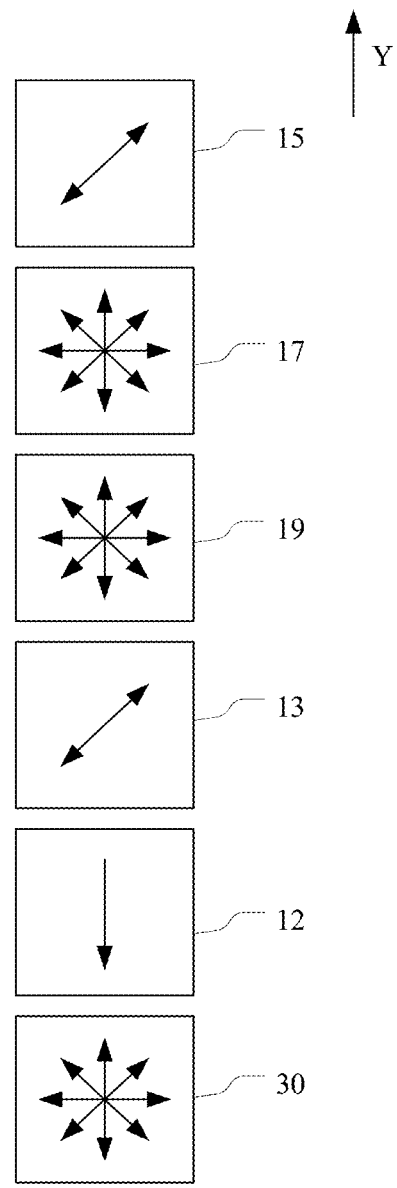
FIG. 7 is a schematic diagram of absorption axes of laminated layers of a display panel according to a third implementation of this application.

FIG. 7 is a schematic diagram of absorption axes of laminated layers of a display panel according to a third implementation of this application. The display panel provided in the third implementation is roughly the same as the display panel provided in the first implementation, except that an angle between an absorption axis of a quarter-wave plate 12 and a positive direction of a first direction is N+3×45 degrees, where N is 45 degrees. In this case, the angle between the absorption axis of the quarter-wave plate 12 and the positive direction of the first direction is 180 degrees, and an angle between an absorption axis of a protective layer 15 and the absorption axis of the quarter-wave plate 12 is 45 degrees.

Embodiment 4

Figure 8:
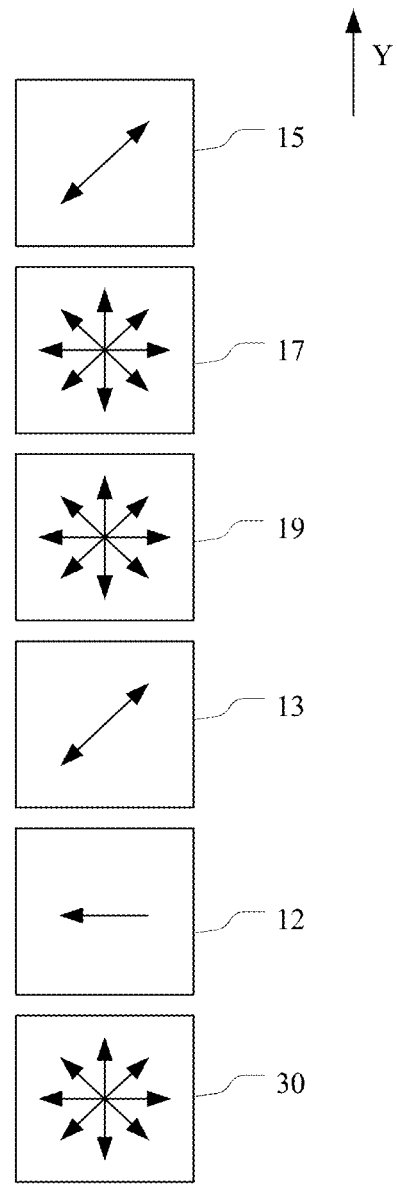
FIG. 8 is a schematic diagram of absorption axes of laminated layers of a display panel according to a fourth implementation of this application.

FIG. 8 is a schematic diagram of absorption axes of laminated layers of a display panel according to the fourth implementation of this application. The display panel provided in the fourth implementation is roughly the same as the display panel provided in the first implementation, except that an angle between an absorption axis of a quarter-wave plate 12 and a positive direction of a first direction is N+5×45 degrees, where N is 45 degrees. In this case, the angle between the absorption axis of the quarter-wave plate 12 and the positive direction of the first direction is 270 degrees, and an angle between an absorption axis of a protective layer 15 and the absorption axis of the quarter-wave plate 12 is 45 degrees.

Embodiment 5

Figure 9:
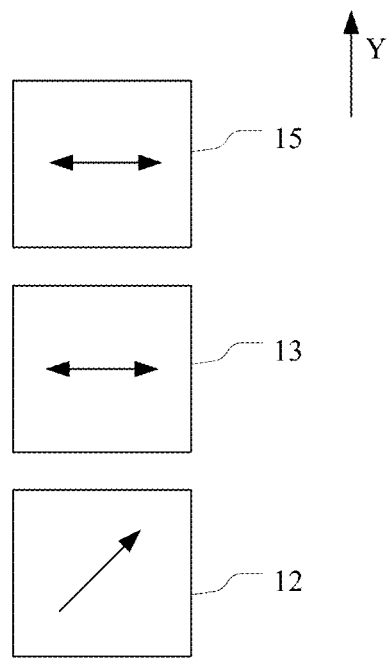
FIG. 9 is a schematic diagram of an absorption axis of a laminated structure according to a fifth implementation of this application.

FIG. 9 is a schematic diagram of an absorption axis of a laminated structure according to a fifth implementation of this application. A laminated structure of a display panel provided in the fifth implementation is roughly the same as that of the display panel provided in the first implementation, except that an inclination angle of an absorption axis of a protective layer 15 with respect to a first direction (for example, a Y direction shown in FIG. 9) is 90 degrees, namely, N is 90 degrees, an inclination angle of an absorption axis of a linear polarizing layer 13 with respect to the first direction (for example, the Y direction shown in FIG. 9) is 90 degrees, and an angle between an absorption axis of a quarter-wave plate 12 and a positive direction of the first direction is N−45 degrees. In this case, the angle between the absorption axis of the quarter-wave plate 12 and the positive direction of the first direction is 45 degrees, and an angle between the absorption axis of the protective layer 15 and the absorption axis of the quarter-wave plate 12 is 45 degrees.

Embodiment 6

Figure 10:
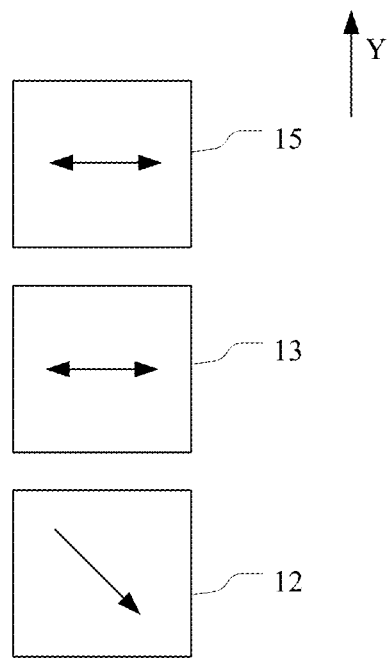
FIG. 10 is a schematic diagram of an absorption axis of a laminated structure according to a sixth implementation of this application.

FIG. 10 is a schematic diagram of an absorption axis of a laminated structure according to a sixth implementation of this application. A laminated structure of a display panel provided in the sixth implementation is roughly the same as that of the display panel provided in the first implementation, except that an inclination angle of an absorption axis of a protective layer 15 with respect to a first direction (for example, a Y direction shown in FIG. 10) is 90 degrees, namely, N is 90 degrees, an inclination angle of an absorption axis of a linear polarizing layer 13 with respect to the first direction (for example, the Y direction shown in FIG. 10) is 90 degrees, and an angle between an absorption axis of a quarter-wave plate 12 and a positive direction of the first direction is N+45 degrees. In this case, the angle between the absorption axis of the quarter-wave plate 12 and the positive direction of the first direction is 135 degrees, and an angle between the absorption axis of the protective layer 15 and the absorption axis of the quarter-wave plate 12 is 45 degrees.

Embodiment 7

Figure 11:
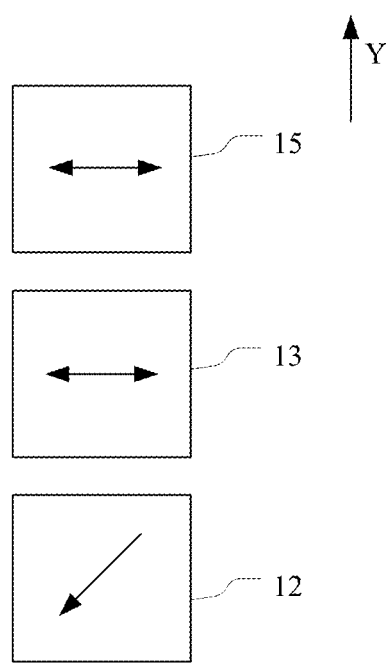
FIG. 11 is a schematic diagram of an absorption axis of a laminated structure according to a seventh implementation of this application.

FIG. 11 is a schematic diagram of an absorption axis of a laminated structure according to a seventh implementation of this application. A laminated structure of a display panel provided in the seventh implementation is roughly the same as that of the display panel provided in the first implementation, except that an inclination angle of an absorption axis of a protective layer 15 with respect to a first direction (for example, a Y direction shown in FIG. 11) is 90 degrees, namely, N is 90 degrees, an inclination angle of an absorption axis of a linear polarizing layer 13 with respect to the first direction (for example, the Y direction shown in FIG. 11) is 90 degrees, and an angle between an absorption axis of a quarter-wave plate 12 and a positive direction of the first direction is N+3×45 degrees. In this case, the angle between the absorption axis of the quarter-wave plate 12 and the positive direction of the first direction is 225 degrees (also 135 degrees), and an angle between the absorption axis of the protective layer 15 and the absorption axis of the quarter-wave plate 12 is 45 degrees.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention Therefore, the protection scope of the present invention shall be subject to the protection scope of the claims.

What is claimed is:

1. A laminated structure, wherein the laminated structure comprises a laminated sequence of
   a protective layer, a reinforcing layer, a linear polarizing layer, a quarter-wave plate, and a functional substrate comprising a plurality of reflection units,
   wherein the protective layer is used to polarize light to form linearly polarized light, an angle between an absorption axis of the protective layer and an absorption axis of the linear polarizing layer is zero degrees, and an angle between the absorption axis of the linear polarizing layer and an absorption axis of the quarter-wave plate is 45 degrees, wherein the reinforcing layer that is arranged between the protective layer and the linear polarizing layer has a material strength that is greater than that of the protective layer;
   wherein the linear polarizing layer is fixed to the reinforcing layer through an optical adhesive layer that is arranged between the polarizing layer and the reinforcing layer, the optical adhesive layer comprising an isotropic material;
   wherein the plurality of reflection units are configured to emit light that are generated by the plurality of reflection units, and to reflect light that is irradiated on the plurality of reflection units;
   wherein the functional substrate is located on one side of the quarter-wave plate away from the protective layer, wherein the functional substrate comprises a second light-transmitting layer located on one side of the quarter-wave plate away from the protective layer, a first light-transmitting layer located on one side of the second light-transmitting layer away from the quarter-wave plate and toward an optical fingerprint recognition module, and the plurality of reflection units arranged between the first light-transmitting layer and the second light-transmitting layer, wherein the first light-transmitting layer and the second-light transmitting layer both comprise respective isotropic material and surround the plurality of reflection units, and
   wherein the quarter-wave plate converts linearly polarized light into circularly polarized light that passes into the functional substrate which surrounds the reflection units.

2. The laminated structure according to claim 1, wherein the reinforcing layer comprises plastic or ceramic.

3. The laminated structure according to claim 1, wherein the reinforcing layer is made of an isotropic material.

4. The laminated structure according to claim 3, wherein the reinforcing layer is a glass cover plate.

5. The laminated structure according to claim 1, wherein the functional substrate comprises a light-transmitting area to allow light emitted from the quarter-wave plate to enter the optical fingerprint recognition module through the light-transmitting area.

6. The laminated structure according to claim 5, wherein plurality of reflection units are spaced on the first light-transmitting layer, the second light-transmitting layer covers the reflection units and the first light-transmitting layer, the light-transmitting area is formed between the adjacent reflection units, and the second light-transmitting layer is located between the quarter-wave plate and the first light-transmitting layer.

7. The laminated structure according to claim 1, wherein the reinforcing layer is used to polarize light to form linearly polarized light, and an angle between an absorption axis of the reinforcing layer and the absorption axis of the linear polarizing layer is zero degrees.

8. An electronic device, comprising:
   a display panel and an optical fingerprint recognition module, wherein the display panel comprises a laminated structure including a laminated sequence of a protective layer, a reinforcing layer, a linear polarizing layer, a quarter-wave plate, and a functional substrate comprising a plurality of reflection units,
   wherein the protective layer polarizes light to form linearly polarized light, an angle between an absorption axis of the protective layer and an absorption axis of the linear polarizing layer is zero degrees, and an angle between the absorption axis of the linear polarizing layer and an absorption axis of the quarter-wave plate is 45 degrees, wherein the reinforcing layer that is arranged between the protective layer and the linear polarizing layer has a material strength that is greater than that of the protective layer,
   wherein the linear polarizing layer is fixed to the reinforcing layer through an optical adhesive layer that is arranged between the polarizing layer and the reinforcing layer, the optical adhesive layer comprising an isotropic material,
   wherein the plurality of reflection units are configured to emit light that are generated by the plurality of reflection units, and to reflect light that is irradiated on the plurality of reflection units,
   wherein the functional substrate comprises a second light-transmitting layer located on one side of the quarter-wave plate away from the protective layer, a first light-transmitting layer located on one side of the second light-transmitting layer away from the quarter-wave plate and toward the optical fingerprint recognition module, and the plurality of reflection units arranged between the first light-transmitting layer and the second light-transmitting layer, wherein the first light-transmitting layer and the second-light transmitting layer both comprise respective isotropic material and surround the plurality of reflection units,
   and wherein the quarter-wave plate converts linearly polarized light into circularly polarized light that passes into the functional substrate which surrounds the reflection units.

9. The electronic device according to claim 8, wherein the reinforcing layer comprises plastic or ceramic.

10. The electronic device according to claim 8, wherein the reinforcing layer is made of an isotropic material.

11. The electronic device according to claim 10, wherein the reinforcing layer is a glass cover plate.

12. The electronic device according to claim 8, wherein the display plan panel is a flexible display panel.

13. The electronic device according to claim 12, wherein the functional substrate comprises an organic light-emitting diode.

14. The electronic device according to claim 8, wherein the reinforcing layer polarizes light to form linearly polarized light, and an angle between an absorption axis of the reinforcing layer and the absorption axis of the linear polarizing layer is zero degrees.

15. The electronic device according to claim 8, wherein the plurality of reflection units are spaced on the first light-transmitting layer, the second light-transmitting layer covers the reflection units and the first light-transmitting layer, the light-transmitting area is formed between the adjacent reflection units, and the second light-transmitting layer is located between the quarter-wave plate and the first light-transmitting layer.

16. The electronic device according to claim 15, wherein both the first light-transmitting layer and the second light-transmitting layer are made of isotropic materials.

17. The electronic device according to claim 8, wherein the electronic device is a mobile phone.

18. The electronic device according to claim 8, wherein the protective layer is arranged as an outermost layer of the display panel.

19. The laminated structure according to claim 1, wherein a portion of the circularly polarized light enters the optical fingerprint recognition module through the functional substrate.

20. The electronic device according to claim 8, wherein a portion of the circularly polarized light enters the optical fingerprint recognition module through the functional substrate.

* * * * *